United States Patent Office 3,359,219
Patented Dec. 19, 1967

3,359,219
EXPANDABLE STYRENE POLYMERS
Alvin R. Ingram, Murrysville, Alvin J. Zupanc, Irwin, and Harold L. Nicholson, Murrysville, Pa., assignors to Koppers Company, Inc., a corporation of Delaware
Filed Sept. 17, 1965, Ser. No. 488,139
10 Claims. (Cl. 260—2.5)

The invention relates generally to expandable polymer compositions and more particularly to compositions which will expand to a low density foam having improved dimensional stability and their method of preparation.

Expandable polystyrene particles are commercially available, for example, under the trademark Dylite. Low density foam structures are made by placing such particles in a mold cavity in an unexpanded or partially expanded condition and heating the particles above the boiling point of the blowing agent and the softening point of the polymer. The particles expand under the influence of heat to fill the mold cavity and fuse together to form a foamed structure.

Shrinkage of the structure with respect to the dimensions of the mold has been a problem. Especially when low density foams (i.e., 1–2 pounds per cubic foot) are molded, careful control of the molding conditions must be exercised. If the molding temperature is too high or the cooling cycle is too short, the foam will collapse and the resulting structure has neither the desired dimensions nor low density. If the particles are not uniformly heated, poor bead-to-bead fusion will occur in those areas where the particles were not sufficiently heated and the resulting foam structure will not have the required strength. Even under ideal molding conditions, some shrinkage of the foam occurs and this shrinkage must be taken into account to obtain a finished article having the desired dimensions.

It is often necessary to introduce additives into the polymer particles to obtain a desired effect; for example, to increase expandability by adding plasticizers or to render the resulting foam self-extinguishing by adding fire retardants. These additives, however, tend to compound the molding problems noted above. When enough of the additive is introduced into the particles to accomplish the desired purpose, it has been difficult to avoid poor fusion and excessive shrinkage. Thus, it has been necessary to keep the addition within limits which fail to completely achieve the desired result (i.e., fire resistance, dimensional stability, and low density) to obtain a usable foam product.

Patent No. 2,994,670 approached the problem by using, as the polymer, a copolymer produced by copolymerizing 70–90 weight percent of styrene and 10–30 weight percent of glycidyl acrylate and blending the foamable polymer with a cross-linking agent having at least two active hydrogen equivalents per molecule such, for example, as an amine, amide, or dicarboxylic acid or anhydride. The foamable composition was heated to volatilize the hydrocarbon blowing agent and form an integral cellular foam at a temperature below that at which considerable cross-linking occurs and then curing the foam by heating to a temperature of 80–135° C. for at least 15 minutes.

It has now been found that the copolymerization of a small amount of tung oil with the styrene monomer provides polymer particles which can be rendered expandable to yield essentially non-shrinking foams that have excellent fusion over a wide range of molding conditions even in the presence of plasticizers and self-extinguishing agents. The particles can be foamed in the conventional manner and without the intense careful control heretofore needed.

The vinyl aryl monomers usable with this invention include styrene, isopropylstyrene, alpha-methylstyrene, nuclear dimethylstyrenes, chlorostyrenes, vinyl naphthalene, etc.

Tung oil of course is a naturally occurring oil derived from the seeds of the tung tree. It consists of various fatty acid glycerides. The typical composition of the fatty acid moiety of tung oil is 79.5 percent by weight eleostearic acid, 15 percent by weight oleic acid, 4 percent by weight palmitic acid, and 1.5 percent by weight stearic acid. Eleostearic acid, which is the fatty acid moiety comprising the largest portion of the tung oil, is a C–18 acid containing three conjugated double bonds capable of co-polymerizing with the vinyl aryl monomer.

The expandable vinyl aryl-tung oil copolymer composition can be prepared by forming an aqueous suspension with the aid of a suspending agent of a free radical producing catalyst, a vinyl aryl monomer and, based upon the weight of this monomer, from 0.7 to 0.025 percent of tung oil, heating the suspension to copolymerize the vinyl aryl monomer and tung oil to form polymer particles, incorporating an aliphatic blowing agent into said polymer particles to render said particles expandable, and recovering said polymer particles from said suspension. The resulting novel heat-stabilized expandable vinyl aryl-tung oil copolymer compositions of the invention which will expand on heating to a low density, shrink resistant cellular foam comprise a vinyl aryl compound copolymerized with from 0.7 to 0.025 percent by weight of vinyl aryl compound of tung oil and from about 3–20 percent by weight of polymer of a blowing agent. The novel copolymers of the invention produce substantially non-shrinking foams having good fusion throughout.

Cross-linking usually fixes the dimension of the material, for example, as it does in the material described in the aforesaid Patent No. 2,994,670. Surprisingly, in spite of a degree of cross-linking in the polymer occasioned by the presence of the copolymerized tung oil, expandability of the polymer particles is actually enhanced. It is postulated that the cross-linking in this invention results in more of the blowing agent being retained in the heat plastified foam during expansion and this results in a more efficient use of blowing agent and consequently a foam of lower density.

Where self-extinguishing agents are incorporated into the polymer composition of this invention, the self-extinguishing properties of the foam are greater than would be expected as the polymer structure of this invention resists the destruction of the foam by melting and resists the spreading of the fire by flaming drops of molten polymer.

A minimum amount of about 0.025 percent by weight of tung oil is needed in order to obtain a beneficial effect on the molding properties of the polymer. Amounts greater than 0.7 percent by weight of tung oil are unnecessary and may interfere with the rate of polymerization and with the stability of the suspension.

Conveniently, the polymerization of the vinyl aryl monomer and tung oil is carried out in aqueous suspension such as is described for example in Patent No. 2,907,756 wherein a styrene monomer in water is polymerized in the presence of a catalyst system of t-butylperbenzoate and benzoyl peroxide at a fixed time temperature cycle using a suspending system to maintain the styrene monomer suspended in the water in the form of particles or beads.

The polymerization is carried out in two stages at two different temperatures using a combination of free radical producing catalysts one of which is activated only at the higher temperature. Sufficient catalyst is therefore available when the higher temperature is reached so that the polymerization of the monomers will be substantially complete with only .1% by weight or less of residual monomer remaining. The process produces substantially spherical beads of a size range of 95% by weight through 10 and on 35 mesh U.S. standard sieve series with a size range of through 10 and on 18 mesh being preferred. The particle size is controlled by the amount and identity of the suspending agents which are employed.

The blowing agent, that renders the polymer particles expandable, is incorporated into the particles either during or after the polymerization. Processes for such incorporation are described in Patent No. 3,192,169 and Patent No. 2,983,692. Preferred blowing agents include volatile hydrocarbons containing from 1–7 carbon atoms in the molecule, i.e, ethane, methane, propane, butane, pentane, hexane, heptane, cyclohexane and their halogenated derivatives which boil below the softening point of the resin of the polymer. Usually from 3–20 percent by weight of polymer of the blowing agent is incorporated therein.

The tung oil can be introduced either by mixing it with the vinyl aryl monomer prior to the start of polymerization or it can be introduced into the polymer by adding it after a portion of the vinyl aryl monomer has polymerized, for example, prior to the time that about 90 percent by weight of the vinyl aryl monomer has polymerized.

To enhance the expandability of the polymers, plasticizers are incorporated into the polymer, preferably by adding them to the monomer charge prior to polymerization. Useful plasticizers include low volatile compounds, for example, 2-ethylhexyl acrylate, mineral oil, ethylbenzene, butyl stearate, and chlorinated diphenyl. The amounts of plasticizer which can be employed is larger than that with conventional expandable styrene polymers since the adverse effects which would otherwise result (i.e., poor bead-to-bead fusion and weakening of the foam structure so that shrinkage or collapse of the foam occurs) are effectively overcome by the presence of the tung oil in the polymer composition. Therefore the amount of plasticizer required to give the desired expandability can be used although amounts greater than 5 percent by weight are normally not needed for this purpose.

The novel polymer compositions of the invention are rendered self-extinguishing by the incorporation therein of various self-extinguishing agents. Preferred are organic bromine compounds which when heated to the ignition temperature of the polymer evolve HBr which is believed to be the active specie which terminates combustion. Normally, amounts of self-extinguishing agent are employed which will cause the foam structure to stop burning one second or less from the time it is removed from contact with the flame from a gas burner.

The amount of self-extinguishing agent needed will depend upon the effectiveness of the particular self-extinguishing agent being employed but will generally range between about 0.5 to 5 percent by weight of polymer. In the past, the actual amount of self-extinguishing agent that can be used is much less than 5 percent since the presence of self-extinguishing agent has the same adverse effect on the molding properties of the composition as plasticizers (i.e., poor fusion and excessive shrinkage of the polymer foam). Therefore, where sufficient amounts of bromine compound alone are employed to render the foam self-extinguishing the molding properties of conventional foams become so poor as to be commercially unacceptable. This adverse effect has been partly avoided in the past by the incorporation into the polymer of a peroxide synergist along with the self-extinguishing agent which permits much smaller amounts of self-extinguishing agent to be employed.

The novel polymer compositions of the invention provide good molding characteristics even when amounts of self-extinguishing agent are employed such that the foam is rendered self-extinguishing without the need of peroxide synergists. Of course, the novel polymer compositions also have improved characteristics even when smaller amounts of self-extinguishing agent are used in conjunction with a peroxide synergist. Examples of suitable self-extinguishing agents include tris-(2,3-dibromopropyl)-phosphate (Firemaster T23P) and the brominated vegetable oils (for example, brominated cottonseed oil) described in co-pending application Serial No. 488,248, filed Sept. 17, 1965, now U.S. Patent No. 3,359,220, as assigned to the assignee of this invention.

Figure 1:
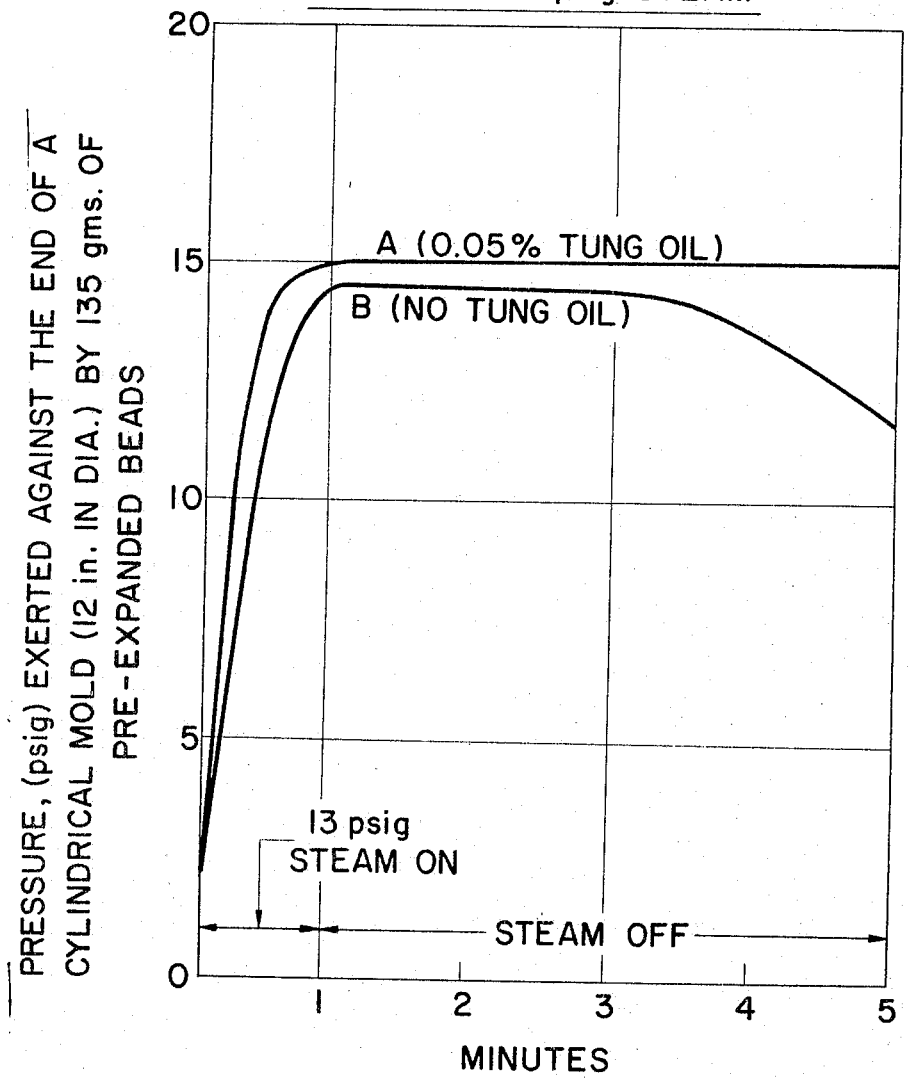
FIGURE 1 is a graph showing the pressure generation pattern of the novel expandable compositions of the invention as compared to a conventional expandable styrene polymer during the molding of the respective compositions.

The invention is further illustrated by the following examples wherein parts are parts by weight unless otherwise indicated.

*Example I*

In order to illustrate the improved characteristics of the noval polymers with regard to foam shrinkage a series of styrene polymers were prepared without tung oil, with tung oil added to the polymer particles at about 90 percent conversion of styrene, with tung oil added to the monomer charge and copolymerized with styrene, and with two other drying oils each copolymerized with styrene. The method of preparation was the same in each case except for the amount and the identity of the drying oil employed and the manner of addition of the tung oil which are indicated in Table I.

To 12-ounce beverage bottles there were charged 80 parts of styrene and X% by weight of styrene of the oil indicated in Table I containing the catalysts 0.24 part of benzoyl peroxide and 0.11 part of t-butyl perbenzoate and 120 parts of water containing as suspending agents 0.48 part tricalcium phosphate and 0.0036 part dodecylbenzene sodium sulfonate (Nacconol NRSF). The bottles were capped and placed in an oil bath where they were rotated end-over-end for 7 hours with the oil bath temperature being maintained at 92° C. to cause the monomers to polymerize. The bottles were then cooled to 23° C. and there was added to each bottle 0.8 part tricalcium phosphate, 0.008 part dodecylbenzene sodium sulfonate (Nacconol NRSF), and 7.2 parts of the blowing agent n-pentane. The bottles were recapped and placed in the oil bath where they were rotated and heated at 115° C. for 4 hours in order to complete the polymerization and incorporate the blowing agent into the polymer particles. The slurry was acidified with dilute hydrochloric acid to solubilize the suspending agents, and the particles were washed with water and air dried. One gram portions of the beads were subjected to an air temperature of 150° C. for 90 minutes which caused expansion of the particles to a foam structure. The properties of the resulting foam are given in Table I.

TABLE I

| Exp. No. | Drying Oil | (X) percent by Wt. Drying Oil | 90 Minutes, 150° C., Foam Collapse |
|---|---|---|---|
| I-1 | | 0 | Complete. |
| I-2 | Linseed Oil | 0.15 | Do. |
| I-3 | Cottonseed Oil | 0.15 | Do. |
| I-4 | Tung Oil | 0.15 | Very Little. |
| I-5 | ____do ¹ | 0.15 | Very poor expansion. |

¹ No tung oil added to the monomer charge but tung oil added with blowing agent at or about 90% conversion of styrene.

It can be seen that while the polymer foams containing no tung oil or the other drying oils completely collapsed at 150° C. the foam containing the copolymerized tung oil was not seriously affected by the high temperature for an extended period of time. This demonstrates the ability of the novel copolymers of the invention to withstand high molding temperatures without collapse as compared to styrene homopolymer and styrene copolymers containing other drying oils. The polymer containing the tung oil which was added at about 90% conversion of styrene failed to expand to a low density foam. This is probably caused by the formation of a hard, cross-linked tung oil shell on the particles which prevented sufficient expansion of the particles and indicated the need for forming homogeneous tung oil-styrene copolymer particles.

*Example II*

Two polymers were prepared by the procedure described below except that one polymer contained no tung oil and the other polymer contained 0.05 percent by weight of tung oil. The results are indicated in Table II.

To a reactor equipped with a three blade impeller there was added in the order named 108 parts water containing as suspending agents 0.8 part tricalcium phosphate and 0.006 part dodecylbenzene sodium sulfonate (Nacconol NRSF) and while agitating at an impeller speed at 110 r.p.m. 100 parts of styrene, 2.0 parts of tris(2,3-dibromopropyl)phosphate as the self extinguishing agent, X parts of tung oil where X is the quantity shown in Table II as comonomer, 0.38 part of benzoyl peroxide and 0.15 part of t-butyl perbenzoate as catalysts, and 0.35 part of the self-extinguishing synergist (Lupersol–130, 2,5-dimethyl-2,5-di(t-butylperoxy)-hexyne-3. The mixture was heated to 90° C. in order to initiate polymerization which took 85 minutes. The mixture was maintained at 90° C. for an additional 370 minutes after which 0.005 part of Nacconol NRSF and the blowing agent system (which was 8 parts of a 50/50 mixture by weight of isopentane and n-pentane) were added to the reactor in the order named. The agitator speed was increased to 125 r.p.m. and the mixture maintained at 90° C. for a total of 90 minutes after the start of the addition of the blowing agent. The temperature was then raised to 115° C. which took 35 minutes. The mixture was maintained at 115° C. for 360 minutes in order to complete polymerization and incorporate the blowing agent into the polymer particles. The slurry was acidified with dilute hydrochloric acid and the polymer particles were then centrifuged to remove them from the aqueous phase and washed with water for 5 minutes after which the polymer particles were dried. Ultraviolet analysis of the polymer showed a monomer content of .1% by weight.

The polymer particles were continuously pre-expanded in a 55-gallon Rodman pre-expander described in Patent No. 3,025,175 at a rate of 450 pounds per hour. The polymers expanded to the densities shown in Table II. Aliquots of the pre-expanded particles were then molded into foam blocks having the dimension of 1 x 2 x 2 feet by placing them in a mold cavity contained in a steam chest and injecting steam under pressure into the beads to cause them to expand to completely fill the mold cavity and fuse together. The amount of shrinkage and block cavitation, the required cooling time to minimize shrinkage of the foam, and the steam pressure required to obtain optimum fusion are listed in Table II below.

It can be seen from the data that the particles of the invention can be molded at a wider range of steam pressures, at lower steam pressures and produce a foam block having better fusion than that which can be achieved at any steam pressure using the conventional polystyrene particles. Furthermore the block molded from the novel composition has much better dimensional stability, as very little block cavitation occurs, while the cooling time of the foam structure required to make it self-sustaining is not noticeably increased.

Furthermore, it can be seen from Table II that, surprisingly, in spite of the presence of the cross-linking produced by the tung oil that the polymer particles of the invention actually expand to a lower density than those containing no tung oil. This is believed to be due to the better retention of the blowing agent in the heat plastified polymer.

A demonstration of the increased retention of blowing agent is shown in FIGURE 1. 135 gram portions of the pre-expanded beads were placed in a cylindrical mold of 12 inch diameter having a movable end wall attached to a pressure sensing device. Steam at 13.0 p.s.i.g. was injected into the beads for one minute and the pressure recorded during the steam injection and for 5 minutes after the steam was shut off. It can be seen that the novel copolymer beads (curve A) generated a greater pressure and this pressure maximum held constant whereas with the conventional beads (curve B) the pressure dropped showing a loss of the blowing agent vapors from the beads which are responsible for exerting the pressure. The maintenance of maximum pressure is required for the continuous molding of foam board from expandable styrene polymer beads.

Figure 2:
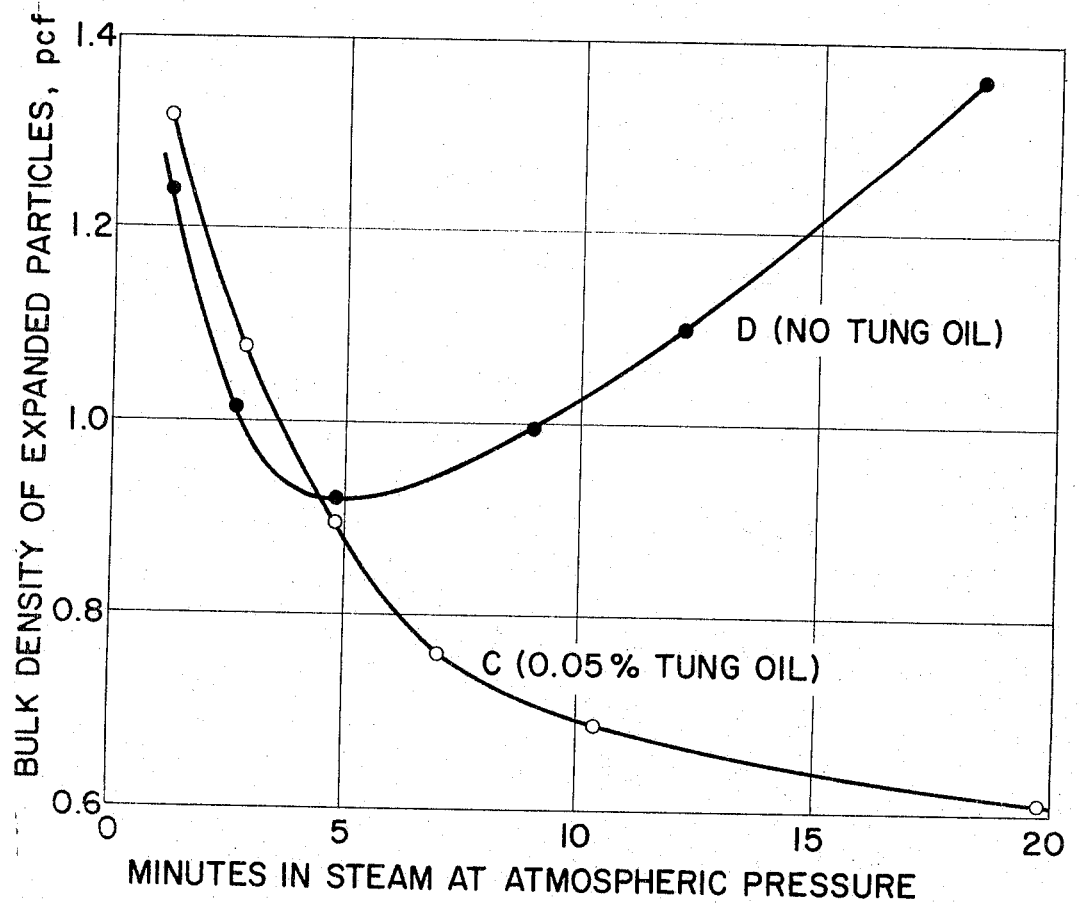
FIGURE 2 is a graph showing the bulk density of the novel expandable compositions in atmospheric steam as compared to a conventional expandable styrene polymer.

As a further illustration of the superior expandability and heat stability of the tung oil containing polymer, one gram portions of the particles were placed in steam at atmospheric pressure and the bulk density of the expanded beads recorded. The results are shown in FIGURE 2. It can be seen that the density of the tung oil copolymer beads (curve C) continued to drop whereas the conventional beads (curve D) reached a minimum density and then began to shrink. This latter is indicative of beads which would create shrinkage problems when the pre-expanded beads were molded into a foam article.

*Example III*

In order to illustrate the effects of the amount of tung oil on foam shrinkage a series of experiments were carried out with the amounts of tung oil shown in Table III. To illustrate a different manner of incorporation of the tung oil into the polymer the tung was added 85 minutes after the polymerization mixture had been heated to 90° C. or at about 30–40 percent conversion of the styrene monomer. The following procedure was employed. To a 2-liter resin kettle equipped with an agitator there was added in the order named 500 parts of water, a styrene monomer solution containing 500 parts of styrene monomer and 20 parts of self-extinguishing agent which was tris-(2,3-dibromopropyl)phosphate (Firemaster T23P), and the catalysts 1.75 parts benzoyl peroxide and 0.75

TABLE II

| Exp. No. | (X) percent by Weight Tung Oil | Prepuff Density, lb./ft.$^3$, 450 lb./hr. | Molding | | | |
|---|---|---|---|---|---|---|
| | | | Block Cavitation in Inches at Minimum Steam Pressure | Cool Time, Minutes | Steam Pressure for Optimum Fusion, p.s.i.g. | Minimum Pressure for Optimum Fusion, p.s.i.g. |
| II-1 | 0 | 1.1–1.2 | 3/16 to 3/8 | 5–8 | Food Fusion 13–15 | 13 not 11. |
| II-2 | 0.05 | .96 | 1/8 | 8 | Excellent Fusion 9–15 | 9 not 7. | part t-butyl perbenzoate. The mixture was agitated with an upward deflecting propellor agitator against a thermowell baffle for 80 minutes at 90–92° C. after which there was added 0.25 part of tetra-sodium pyrophosphate and 0.75 part of hydroxyethyl cellulose (Natrosol 250–GR). After the mixture had been heated for a total of 85 minutes at 90–92° C. the amount (X) of tung oil in percent by weight of styrene shown in Table III was added to the kettle. Heating was continued for a total of 7.5 hours at 90° C. after which the mixture was cooled to 23° C. 200 parts of the slurry was introduced into a 12-ounce beverage bottle along with 0.2 part of polyoxyethylene-90-sorbitan monolaurate and 7.8 parts of n-pentane. The bottle was capped and heated with end-over-end agitation in an oil bath for 4 hours at 115° C. The product was separated from the reaction mixture, thoroughly washed with water and air dried at room temperature.

The dried beads were then expanded in atmospheric steam for 2–4 minutes to a density of approximately 2 pounds per cubic foot. The beads were permitted to age for 24 hours in the atmosphere and the pre-expanded beads were then molded into a ⅜ x 5 x 5 inch block by placing them in a ⅜ x 5 x 5 inch mold held between the platens of an electrically heated press at 250° F. The foam block had the amount of shrinkage shown in Table III.

TABLE III

| Exp. No. | (X) Percent by Weight Tung Oil | Molding Shrinkage, 250° F. |
|---|---|---|
| III-1 | 0 | Excessive. |
| III-2 | 0.025 | Moderate. |
| III-3 | 0.1 | Some. |
| III-4 | 0.2 | Nil. |
| III-5 | 0.3 | Nil. |
| III-6 | 0.4 | Nil. |
| III-7 | 0.7 | Nil. |

It can be seen from the results listed in Table III that the presence of increasing amounts of tung oil overcomes the shrinkage problem where an amount of self-extinguishing agent sufficent to cause excessive shrinkage of a styrene homopolymer foam is incorporated into the polymer.

*Example IV*

In order to illustrate the effect of heat stabilization by tung oil of plasticized expandable styrene polymers, two polymers were prepared by the same procedure except that one polymer contained 0.1 percent by weight of monomers of tung oil. The catalysts 0.28 part benzoyl peroxide and 0.10 part t-butyl perbenzoate were dissolved in a monomer mixture of 4 parts alpha-methylstyrene, 76 parts of styrene, X percent of tung oil where X is the quantity shown in Table IV and 0.08 part mineral oil. The mixture was charged to a 12 ounce beverage bottle along with 120 parts of water containing as suspending agents 0.64 part tricalcium phosphate and 0.0048 part dodecylbenzene sodium sulfonate (Nacconol NRSF). The bottle was closed and the mixture was heated with end-over-end agitation for 8 hours in an oil bath at 90° C. in order to polymerize the monomers into polymer beads. The mixture was then cooled to from 28° C. and 0.8 part of tricalcium phosphate, 0.008 part of dodecylbenzene sodium sulfonate (Nacconol NRSF) and 6.7 parts of n-pentane were added to the bottle. The contents of the bottle were thoroughly shaken after each addition and the bottle was then closed and the mixture was placed in an oil bath with end-over-end agitation for 4 hours at 115° C. in order to complete the polymerization and impregnate the n-pentane into the beads. The product was separated from the reaction mixture, thoroughly washed with water, and air dried at room temperature. One gram portions of the beads were placed in steam at 100° C. for 7 minutes and the bulk density and shrinkage of the foam particles determined and recorded as listed in Table IV. Portions of the beads were placed in an air oven at 150° C. with the results obtained shown in Table IV.

TABLE IV

| Exp. No. | (X) percent by Weight Tung Oil | Expansion by Steam at 100° C. | | Expansion in Air at 150° C. |
| | | Bulk Density, lb./ft.³ | Shrinkage in Additional Two Minutes at 100° C. | |
| | | 3 Min. | 5 Min. | | |
|---|---|---|---|---|---|
| IV-1 | 0 | 0.87 | 1.36 | 56% by volume | Noticeable shrinkage from maximum foam volume with 5 minutes. |
| IV-2 | 0.10 | 0.94 | 1.05 | 12% by volume | Very slight shrinkage from maximum foam volume after 30 minutes. |

It can be seen that the plasticized tung oil beads expanded to a lower final density and shrinkage was greatly reduced.

*Example V*

As an illustration of the effect of tung oil on the molding and self-extinguishing characteristics of expandable foams containing peroxide synergists and bromine compounds the following series of experiments were carried out utilizing the amount of tung oil X given in Table V. The polymers were prepared using the following procedure. To 12-ounce beverage bottles there was added 120 parts of water, 80 parts of styrene and the amount X% by weight based on styrene of tung oil listed in Table V along with the catalyst, 0.28 part benzoyl peroxide and 0.10 part of t-butyl perbenzoate, the SE synergist, .16 part of Lupersol 130, 1.2 part of the self-extinguishing agent Akwilox–133 (brominated cottonseed oil), 37% by weight bromine, and the suspending system consisting of 0.64 part tricalcium phosphate and 0.0048 part dodecylbenzene sodium sulfonate (Nacconol NRSF). The bottles were tumbled with end-over-end agitation in an oil both heated between 90 and 92° C. for 6 hours after which they were cooled to 23° C. and the dispersants 0.8 part tricalcium phosphate and 0.008 part Nacconol NRSF were added along with 6.2 part of n-pentane with the bottles being shaken after each addition. The bottles were recapped and replaced in the oil bath where they were agitated end-over-end at 115° C. for four hours. The contents were cooled and the bead slurry acidified with HCl in order to solubilize the tricalcium phosphate, the beads separated by filtration and washed with water and air dried. Aliquot portions of the beads were pre-expanded in atmospheric steam for 2–4 minutes to a density of about 3 pounds per cubic foot. The beads were permitted to age for 24 hours in the atmosphere and then molded into ⅜ x 5 x 5 inch blocks by placing them in a ⅜ x 5 x 5 inch mold held between the platens of an electrically heated press for one minute at the temperatures shown in Table V. The blocks were cut into 5 one inch strips and the strips conditioned overnight in a 50–60° C. oven to remove any residual blowing agent. Self-extinguishing tests were conducted on the foam strips suspended vertically in a draft free hood and ignited by holding a ½ inch flame from a microburner in contact with the bottom of each strip for from 3–5 seconds. The average time to extinguishment of the sustained burning after the flame was removed from the strips was determined. The average time to extinguishment for the 5 strips of each sample is shown in Table V. Average time to extinguishment of about 1.0 second or less is considered to be adequate for commercial acceptability.

TABLE V

| Exp. No. | (X) Percent by Weight Tung Oil | Stability of Foam During Molding, ° F. | SE Testing | |
|---|---|---|---|---|
| | | | Dripping of Melt | Seconds to Extinguishment (avg.) |
| V-1 | 0 | OK 245, Unstable 250 | Much | 1.5 |
| V-2 | 0.05 | OK 250, Unstable 255 | do | 1.2 |
| V-3 | 0.10 | OK 260, Unstable 270 | do | 1.2 |
| V-4 | 0.25 | OK 270, Unstable 285 | Moderate | 1.0 |
| V-5 | 0.50 | OK to 285 | do | 1.0 |
| V-6 | 1.0 | Suspension failed after adding pentane. | | |

It can be seen that the presence of the tung oil reduces the dripping of the melt, increases the stability of the foam during molding at higher molding temperatures and has the effect of lowering the self-extinguishing time with the same amount of brominated cottonseed oil as compared to the foams which do not contain the tung oil. It is also noted that the use of 1.0 percent by weight of tung oil in the monomer charge resulted in a failure of the suspension.

The foregoing has described novel heat stable, expandable styrene polymers and the method of their preparation whereby the polymers can be expanded to non-shrinking foams having excellent fusion in spite of the molding conditions employed or the presence of various additives in the polymer. In fact, the compositions permit the molding of foamed structures under conditions which it has been heretofore impossible to employ and still achieve a satisfactory foam. It also permits the obtaining of foam structures from compositions which previously would not yield a satisfactory foam due to a weakening of the foam structure caused by the presence of certain additives which is overcome by the presence of the tung oil.

We claim:

1. A heat stable copolymer composition which will expand on heating to a low density shrink resistant cellular foam comprising a vinyl aryl monomer copolymerized with from 0.7 to 0.025 percent by weight of vinyl aryl monomer of tung oil, said composition containing from about 3–20 percent by weight of copolymer of a blowing agent.

2. Heat stable expandable styrene-tung oil copolymer particles which will expand on heating to a low density shrink resistant cellular foam comprising styrene copolymerized with from 0.7 to 0.025 percent by weight of styrene of tung oil, said particles containing from about 3–20 percent by weight of copolymer of a blowing agent.

3. A heat stable, self-extinguishing, expandable vinyl aryl-tung oil copolymer composition which will expand on heating to a low density, substantially non-shrinking cellular foam comprising a vinyl aryl monomer copolymerized with from 0.7 to 0.025 percent by weight of vinyl aryl monomer of tung oil, said composition containing from about 3–20 percent by weight of copolymer of a blowing agent and from about 0.5 to 5.0 percent by weight of copolymer of a self-extinguishing agent.

4. A heat stable self-extinguishing expandable vinyl aryl-tung oil copolymer composition which will expand on heating to a low density, substantially non-shrinking cellular foam comprising a vinyl aryl monomer copolymerized with from 0.7 to 0.025 percent by weight of vinyl-aryl monomer of tung oil, said composition containing from about 3–20 percent by weight of copolymer of a blowing agent and from about 0.5 to 5.0 percent by weight of copolymer of a plasticizer and self-extinguishing agent.

5. A heat stable self-extinguishing expandable styrene-tung oil copolymer composition which will expand on heating to a low density substantially non-shrinking cellular foam comprising styrene copolymerized with from 0.7 to 0.025 percent by weight of styrene of tung oil, said composition containing from about 3–20 percent by weight of copolymer of a blowing agent and from about 0.5 to 5.0 percent by weight of copolymer of an organic bromine self-extinguishing compound.

6. A heat stable, low density cellular foam structure having improved dimensional stability comprising a vinyl aryl monomer copolymerized with from 0.7 to 0.025 percent by weight of vinyl aryl monomer of tung oil.

7. A process for the preparation of a heat stable, expandable copolymer composition which will expand on heating to a low density shrink resistant cellular foam comprising copolymerizing a vinyl aryl monomer with from 0.7 to 0.025 percent by weight of said monomer of tung oil and incorporating in said composition from about 3–20 percent by weight of composition of a blowing agent.

8. A process for the preparation of heat stable, expandable vinyl aryl-tung oil copolymer particles which will expand on heating to a low density shrink resistant cellular foam comprising forming an aqueous suspension of a free radical producing catalyst, a vinyl aryl monomer, and from about 0.7 to 0.025 percent by weight of said monomer of tung oil with the aid of a suspending agent, heating said suspension to cause said monomers to polymerize to form polymer particles, impregnating said particles with from about 3–20 percent by weight of particles of blowing agent, and recovering said particles from said suspension.

9. A method of preparing heat stable, expandable styrene-tung oil copolymer particles which will expand on heating to a low density substantially non-shrinking cellular foam comprising forming an aqueous suspension of a free radical producing catalyst and styrene with the aid of a suspending agent, heating said suspension to cause said styrene to polymerize, adding to said suspension from 0.7 to 0.025 percent by weight of styrene prior to the time that about 90 percent by weight of said styrene monomer has polymerized, containing said heating to cause said tung oil and said styrene to copolymerize, impregnating said particles with from 3 to 20 percent by weight of polymer of a blowing agent and thereafter recovering said particles from said suspension.

10. A heat stable, self-extinguishing, expandable vinyl aryl-tung oil copolymer composition which will expand on heating to a low density, substantially non-shrinking cellular foam comprising a vinyl aryl monomer copolymerized with from 0.7 to 0.025 percent by weight of vinyl aryl monomer of tung oil, said composition containing from about 3–20 percent by weight of copolymer of a blowing agent and up to about 5.0 percent by weight of copolymer of a plasticizer.

References Cited
UNITED STATES PATENTS

| | | | |
|---|---|---|---|
| 2,485,592 | 10/1949 | Griess et al. | 260—23 |
| 2,647,111 | 7/1953 | Shusman | 260—23 |
| 2,698,839 | 1/1955 | Bradshaw et al. | 260—23 |
| 2,852,478 | 9/1958 | Boelhouwer et al. | 260—23 |

MURRAY TILLMAN, Primary Examiner.

M. FOELAK, Assistant Examiner.